(12) United States Patent
Hackenberger et al.

(10) Patent No.: US 7,562,388 B2
(45) Date of Patent: Jul. 14, 2009

(54) METHOD AND SYSTEM FOR IMPLEMENTING SECURITY DEVICES IN A NETWORK

(75) Inventors: William Frank Hackenberger, Los Altos, CA (US); Randy Jay Hendry, San Jose, CA (US); Christopher James Wood, Reading (GB)

(73) Assignee: International Business Machines Corporation, Armonk, NY (US)

( * ) Notice: Subject to any disclaimer, the term of this patent is extended or adjusted under 35 U.S.C. 154(b) by 1337 days.

(21) Appl. No.: 10/159,139

(22) Filed: May 31, 2002

(65) Prior Publication Data

US 2002/0184532 A1 Dec. 5, 2002

Related U.S. Application Data

(60) Provisional application No. 60/294,696, filed on May 31, 2001.

(51) Int. Cl.
*G08B 23/00* (2006.01)
(52) U.S. Cl. .............................. 726/22; 726/23; 726/24; 726/25
(58) Field of Classification Search .................. 726/22, 726/23, 24, 25
See application file for complete search history.

(56) References Cited

U.S. PATENT DOCUMENTS

| | | | |
|---|---|---|---|
| 4,819,234 A | 4/1989 | Huber | |
| 5,278,901 A | 1/1994 | Shieh et al. | |
| 5,345,595 A | 9/1994 | Johnson et al. | |
| 5,414,833 A | 5/1995 | Hershey et al. | |
| 5,475,839 A | 12/1995 | Watson et al. | |
| 5,586,260 A | 12/1996 | Hu | |
| 5,590,331 A | 12/1996 | Lewis et al. | |
| 5,606,668 A | 2/1997 | Shwed | |
| 5,623,601 A | 4/1997 | Vu | |
| 5,630,061 A | 5/1997 | Richter et al. | |
| 5,761,504 A | 6/1998 | Corrigan et al. | |
| 5,764,887 A | 6/1998 | Kells et al. | |
| 5,764,890 A | 6/1998 | Glasser et al. | |

(Continued)

FOREIGN PATENT DOCUMENTS

WO  WO 98/41919  9/1998

(Continued)

OTHER PUBLICATIONS

Alves-Foss, J., An overview of SNIF: a tool for Surveying Network Information Flow, Network and Distributed System Security, 1995, pp. 94-101 (1995).
Essex, David; *E-Sleuths Make Net Safe for E-Commerce*; Computerworld; Jun. 2000; pp. 1-2.

(Continued)

*Primary Examiner*—Benjamin E Lanier
(74) *Attorney, Agent, or Firm*—King & Spalding LLP (57) ABSTRACT

Supporting the implementation and collaboration of a variety of security modules in a distributed computing network. A security interface provides a universal platform for coupling security modules to the network. The various security modules are linked to and provide identifying information to the security interface. The security interface also receives subscription requests used to coordinate which security modules will communicate. When a security event occurs, a message can be generated by the relevant security module. The security interface shares the message with those security modules that have subscribed to the relevant security module. The sharing of security information enables better performance by the entire network security system.

24 Claims, 8 Drawing Sheets

U.S. PATENT DOCUMENTS

| | | | |
|---|---|---|---|
| 5,787,177 | A | 7/1998 | Leppek |
| 5,796,942 | A | 8/1998 | Esbensen |
| 5,798,706 | A | 8/1998 | Kraemer et al. |
| 5,815,574 | A | 9/1998 | Fortinsky |
| 5,828,833 | A | 10/1998 | Belville et al. |
| 5,832,208 | A | 11/1998 | Chen et al. |
| 5,832,211 | A | 11/1998 | Blakley, III et al. |
| 5,835,726 | A | 11/1998 | Shwed et al. |
| 5,838,903 | A | 11/1998 | Blakely, III et al. |
| 5,857,191 | A | 1/1999 | Blackwell, Jr. et al. |
| 5,864,665 | A | 1/1999 | Tran |
| 5,875,296 | A | 2/1999 | Shi et al. |
| 5,881,236 | A | 3/1999 | Dickey |
| 5,884,033 | A | 3/1999 | Duvall et al. |
| 5,892,903 | A * | 4/1999 | Klaus .................... 726/25 |
| 5,950,012 | A | 9/1999 | Shiell et al. |
| 5,964,839 | A | 10/1999 | Johnson et al. |
| 5,983,270 | A | 11/1999 | Abraham et al. |
| 5,983,348 | A | 11/1999 | Ji |
| 5,987,606 | A | 11/1999 | Cirasole et al. |
| 5,987,611 | A | 11/1999 | Freund |
| 6,014,645 | A | 1/2000 | Cunningham |
| 6,016,553 | A | 1/2000 | Schneider et al. |
| 6,026,442 | A | 2/2000 | Lewis et al. |
| 6,035,423 | A | 3/2000 | Hodges et al. |
| 6,041,347 | A | 3/2000 | Harsham et al. |
| 6,061,795 | A | 5/2000 | Dircks et al. |
| 6,085,224 | A | 7/2000 | Wagner |
| 6,088,803 | A | 7/2000 | Tso et al. |
| 6,088,804 | A | 7/2000 | Hill et al. |
| 6,098,173 | A | 8/2000 | Elgressy et al. |
| 6,119,234 | A | 9/2000 | Aziz et al. |
| 6,266,774 | B1 | 7/2001 | Sampath et al. |
| 6,275,938 | B1 | 8/2001 | Bond et al. |
| 6,405,318 | B1 | 6/2002 | Rowland |
| 6,484,203 | B1 * | 11/2002 | Porras et al. .................. 709/224 |

FOREIGN PATENT DOCUMENTS

| | | |
|---|---|---|
| WO | WO 00/54458 | 9/2000 |
| WO | WO 01/84285 | 11/2001 |
| WO | WO 02/06928 | 1/2002 |
| WO | WO 02/056152 | 7/2002 |

OTHER PUBLICATIONS

Hyland, et al., Concentric Supervision of Security Applications: A New Security Management Paradigm Computer Security Applications Conference, 1998, pp. 59-68, (1998).

Koilpillai, et al., Recon-A Tool for Incident Detection, Tracking and Response, Darpa Information Survivability Conference and Exposition, 2000, pp. 199-206, (2000).

Mansouri-Samani, et al., A Configurable Event Service for Distributed Systems, Configurable Distributed Systems, 1996, pp. 210-217, (1996).

Newman, David; *Intrusion Detection Systems*; Data Communications; 1998; pp. 1-9.

International Search Report for PCT/US 02/17161 dated Dec. 31, 2002.

International Search Report for PCT/US 01/13769 dated Mar. 8, 2002.

Snapp, Signature Analysis and Communication Issues in a Distributed Intrusion Detection System, Master Thesis, University of California, Davis, California, 1991, pp. 1-40 (See pp. 23-25, para. 3.5).

Satyanarayanan, Integrating Security in a Large Distributed System, ACM Transactions on Computer Systems, vol. 7, No. 3, Aug. 1989, pp. 247-280 (See pp. 253-260, para. 5).

Sugawara, Toshiharu, "A Cooperative LAN Diagnostic and Observation Expert System," Ninth Annual Phoenix Conference on Computers and Communications, 1990 Conference Proceedings, Mar. 21-23, 1990, Scottsdale, Arizona, pp. 667-674. (See pp. 671-672, para. 5).

Casella, Karen A., "Security Administration in an Open Networking Environment," The Ninth Systems Administration Conference, LISA 1995, Monterrey, California, Sep. 17-22, 1995, pp. 67-73. (See pp. 69-71, System Overview).

Benzel et al., "Identification of Subjects and Objects in a Trusted Extensible Client Server Architecture," 18th National Information Systems Security Conference, Oct. 10-13, 1995, Baltimore, Maryland, pp. 83-99. (See p. 93, para. 4.2).

Varadharajan, Vijay, "Design and Management of a Secure Networked Administration System: A Practical Approach," 18th National Information Systems Security Conference, Oct. 10-13, 1995, Baltimore, Maryland, pp. 570-580. (See pp. 570-576, para. 2-3).

Snapp et al., "DIDS (Distributed Intrusion Detection System)—Motivation, Architecture, and An Early Prototype," 14th National Computer Security Conference, Oct. 1-4, 1991, Washington, DC, pp. 167-176. (See pp. 170-171, para. 4-5).

Internet Security Systems, SAFEsuite Decisions 2.6, Frequently Asked Questions, Feb. 21, 2001, pp. 1-10 (See pp. 5-7, paragraphs 24-33).

Lindqvist et al., Detecting Computer and Network Misuse Through the Production-Based Expert System Toolset (P-BEST), Oct. 25, 1998, pp. 1-20 (See pp. 9-10, para. 3.3).

Balasubramaniyan et al., An Architecture for Intrusion Detection Using Autonomous Agents, Jun. 11, 1998, Purdue University, West Lafayette, Indiana, pp. 1-4, http://gunther.smeal.psu.edu/images/b9/f3/bb/9e/ba7f39c3871dcedeb9abd0f70cb84607/1.png (See paragraphs 1.4-1.4.1).

Lindqvist et al., eXpert-BSM: A Host-based Intrusion Detection Solution for Sun Solaris, SRI International, Menlo Park, California, Dec. 10-14, 2001, Proceedings of the 17th Annual Computer Security Applications Conference, pp. 1-12. (See pp. 7-8, para. 4.3-4.4).

Heberlien et al., A Network Security Monitor, 1990, pp. 296-304. (See p. 301, para. 5.3).

Cisco Systems, Inc., NetRanger User's Guide Version 2.1.1, 1998 (See pp. 1-10-1-12).

Porras et al., Emerald: Event Monitoring Enabling Responses to Anomalous Live Disturbances, SRI International, Menlo Park, California, 20th National Information Systems Security Conference, Oct. 1997, pp. 353-365. (See pp. 361-363, para. III.F).

Porras et al., A Mission-Impact Based Approach to INFOSEC Alarm Correlation, SRI International, Menlo Park, California, Oct. 2000, pp. 1-33 (See p. 8, sec. 3).

Internet Security Systems, Preliminary ODM 1.0 Functional Specification, Aug. 1997, pp. 1-7 (See pp. 3-4, paragraphs R1-R16).

Bass, Multisensor Data Fusion for Next Generation Distributed Intrusion Detection Systems, Apr. 28, 1999, Iris National Symposium, pp. 1-6. (See pp. 2-5, sections III-V).

Perrochon, Real Time Event Based Analysis of Complex Systems, Jun. 1998, pp. 1-9 (See p. 6, Communication).

Mukherjee et al., Network Intrusion Detection, IEEE Network, May/Jun. 1994, pp. 26-41 (See pp. 34-36, System Organization).

Bass, Intrusion Detection System and Multisensor Data Fusion, Apr. 2000, Communications of the ACM, vol. 43, No. 4, pp. 99-105 (See pp. 101-102, ID System).

Metcalf et al., Intrusion Detection System Requirements, Sep. 2000, Mitre Corporation, pp. 1-33 (See pp. 5-11, Section 3).

Jou et al., Architecture Design of a Scalable Intrusion Detection System for the Emerging Network Infrastructure, Technical Report CDRL A005, Apr. 1997, MCNC, pp. 1-37 (See pp. 3-11, Section 2).

RealSecure Release 1.2 for UNIX, A User Guide and Reference Manual, 1997, Internet Security Systems, Inc., pp. 1-92. (See pp. 13-18, Ch. 3).

"SAFEsuite Decisions, User Guide," Version 2.5, © 2000 by Internet Security Systems, Inc., pp. 1-194 (See pp. 3-4 and pp. 21-38).

Internet Security Systems, Inc., "Introduction to RealSecure Version 5.0, The Industry's Only Integrated Host-Based and Network-Based Intrusion Detection System", Aug. 22, 2000, pp. 1-47 (See pp. 12-14).

Farley, "RealSecure Fusion Engine Concepts", an ISS White Paper, Jun. 30, 1999, pp. 1-23 (See pp. 4-6, Architecture).

* cited by examiner

Exemplary Module Definition Files

270

| Name: VulnerabilityAssessment | Name: IntrusionDetectionSystem |
|---|---|
| Messages: | Messages: |
| Definition: | Definition: |
| Name: AmIVuln | Name: IdEvent |
| Dtd: {Definition of message format} | Dtd: {Definition of message format} |
| Contract: {Plain language contract} | Contract: {Plain language contract} |
| Definition: | Processor: |
| Name: VulnAnsw | Name: Alert |
| Dtd: {Definition of message format} | Send: IdEvent |
| Contract: {Plain language contract} | Function: {Compiled function name} |
| Processor: | |
| Name: IsVuln | |
| Function: {Compiled function name} | |
| Receive: AmIVuln | |
| Send: VulnAnsw | |
| Processor: | |
| Name: VulnRisk | |
| Code: {Interpreted code} | |
| Receive: RiskQuery | |
| Send: RiskAnsw | |
| | |
| | |

METHOD AND SYSTEM FOR IMPLEMENTING SECURITY DEVICES IN A NETWORK

PRIORITY AND RELATED APPLICATIONS

The present application claims priority to provisional patent application entitled, "Secure Logic: A Run-Time System for the Development and Delivery of Host Protection Products," filed on May 31, 2001 and assigned U.S. application Ser. No. 60/294,696. Applicants hereby incorporate by reference the full disclosure of U.S. application Ser. No. 60/294,696.

TECHNICAL FIELD

The present invention is generally directed to supporting the security of a network and/or of individual systems or groups of systems in a network. More specifically, the present invention facilitates the coordination, integration, and implementation of multiple security devices on a computer system or on multiple computer systems in a distributed computer network.

BACKGROUND OF THE INVENTION

The security of computing networks is an increasingly important issue. With the growth of wide area networks (WANs), such as the Internet and the World Wide Web, people rely on computing networks to transfer and store an increasing amount of valuable information. This is also true of local area networks (LANs) used by companies, schools, organizations, and other enterprises. Typically, LANs are used by a bounded group of people in an organization to communicate and store electronic documents and information. LANs typically are coupled to or provide access to other local or wide area networks. Greater use and availability of computing networks produces a corresponding increase in the size and complexity of computing networks.

With the growth of networks and the importance of information available on the networks, there is also a need for better and more intelligent security. One approach to securing larger and more complex computer networks is to use a greater number and variety of security devices. Security devices can also be used more frequently to monitor the activity or status of the elements in a computing network in order to protect them from attack. Security devices exist in a variety of forms and can be used to monitor, protect, respond to, and evaluate elements in the network such as desktop computers, servers, and routers. These network elements are commonly referred to as hosts and the terms "element" and "host" are used interchangeably herein.

Existing approaches to monitoring the security of computing networks tend to focus on individual security modules. Typical security modules can be categorized as either monitoring modules, assessment modules, or response modules. Often, a module can perform more than one of these functions and security products generally contain elements that implement the functions of one or more security modules. A monitoring module is able to identify a current intrusion or attack, either on the network or on one or more computers making up that network. Examples of monitoring modules are a host-based intrusion detection module, a network-based intrusion detection module, and a virus detection module. An assessment module is able to identify and evaluate potentially exploitable weaknesses or security risks in the network or on one or more computers making up that network. Examples of assessment modules are host based modules which assess file access permissions or patch states, and scanners which identify vulnerabilities by attempting to exploit them across the network. A response module is able to address intrusions or security vulnerabilities that are identified by a monitoring or assessment module. Examples of response modules are auto-fix modules which correct vulnerabilities by changing permissions or applying patches, blocking modules which prevent attacks from reaching their targets and reporting modules which report intrusions or vulnerabilities for human attention. As computing networks have grown and the information they contain become more valuable and vulnerable to attack, network security has become increasingly complicated. The conventional solution to increasing security in complex computing networks is to simply add an increasing number and variety of security modules onto the network. These added security modules can be devices coupled to the network, software modules loaded onto hosts in the network, or a combination of both.

The problem with the conventional method is that it is essentially an ad hoc approach. As networks become more complex and as attackers become more adept at evading simple security measures, more security products are needed to protect the network. With each security device that is added to the network, additional security data is generated. A distributed computing network with multiple security devices quickly becomes unmanageable due to the amount of security data that must be analyzed and the security management decisions that need to be made. Most security systems need more than a single management system, and even those systems with one management system, produce a large volume of data with little ability to correlate and respond based on data from multiple modules.

Furthermore, the various security components that are added to the network do not automatically work together. This produces a situation where there is a large collection of low-level security data and little integration or intelligent use of this data. This large volume of low-level data overburdens computer security system administrators and often results in false-positive security alerts. These problems have been addressed to a limited extent through customized linking of disparate security devices. However, each security component must be customized in order to work with the other security devices in the network and to enable sharing of security data. This customization process is typically expensive and complicated. Some systems support the collection of data from a variety of sources, in some cases in a central database, and limited analysis of that data. But there remains an inability in the prior art to collect live data from multiple security modules, coordinate the analysis of that data, and trigger subsequent near real time security responses that are meaningful.

In view of the foregoing, there is a need in the art for a system and method for managing the security of a complex distributed computing network. Specifically, there is a need to couple disparate security modules to a single interface that allows the security modules to communicate. An integrated system capable of coordinating security data from a variety of sources will have a better context in which to consider security events and make sound decisions.

There is a further need to support an integrated system that allows security modules to send and receive messages and to communicate with logic components that allow the security modules to work together. A network security system can provide a significantly improved security posture when disparate data can be assimilated and acted upon in near real time. Because of the very large volume of raw security vulnerability and possible intrusion events that can be generated, even when a system is not under attack, it is important that these logic modules reside as close to the event sources as possible. This both reduces unnecessary network traffic caused by passing raw data to security management systems, and allows response modules to react in a more timely fashion.

Finally, there is a need to be able to correlate the volumes of data to filter certain events and messages so that security modules are not overwhelmed with information. Simple approaches that count events or reduce event redundancy are common. However, there is a need for a system that allows programmable logic modules to be introduced into a security system such that the modules can accurately reflect the context of security events.

SUMMARY OF THE INVENTION

The present invention is generally directed to coordinating security for a computer or network of computing devices. Specifically, the invention comprises a self-contained memory space to which various software modules that perform security functions can be coupled. The architecture of the invention facilitates the addition of security modules in a modular fashion. The invention further comprises a method for facilitating communication among disparate security-related devices. Communication among security-related devices enables more sophisticated analysis of and response to security events.

In one aspect, the invention comprises an integrated system for coordinating communication among disparate security software modules on one or more computers in a distributed computing network. An interface, typically coupled to the network, contains a shared memory and a message passing mechanism. The interface provides the platform to which various security software modules can be coupled. The security software modules can be the aforementioned monitoring modules, assessment modules, and response modules. The security software modules can also be logic modules for receiving security data and making decisions in response to the data. Definition files associated with the security software modules can contain definitions for the types of security messages the module sends and receives and the message processors that handle those messages. The security software modules further comprise a common memory for storing state data that can be shared among the message processors of a given module. Communication among the various security software modules occurs using the shared memory of the interface when the modules are running on the same host. In the instance where the interface is coupled to a network, communication among the modules can occur across the network itself.

In another aspect, the invention comprises a method for coordinating security for a computer network using a variety of security modules. The security modules can be coupled to the interface such that their identifying information is loaded into a shared memory within the interface. The interface identifies each security module that is present and can receive subscription information from each security module for use in subsequent message handling. System-wide security policies or settings determined by a network administrator can be passed to the security modules through the interface. Once the entire system is started, the various security modules use messages to communicate information concerning security events. The interface works in tandem with a security module to build a message,. The interface can store the message in the shared memory for access by each security module that has subscribed for the message. The security modules can also incorporate filtering processes to determine whether to create a message in response to an event or to decide whether to receive a message.

These and other aspects of the invention will be described below in connection with the drawing set and the appended specification and claim set.

DETAILED DESCRIPTION OF THE EXEMPLARY EMBODIMENTS

The present invention supports the integration of a variety of security modules in one or more computers within a distributed computing environment. Specifically, the present invention supplies an interface that can identify security modules in a computing network and allow them to communicate efficiently with each other. Using the interface's messaging system, a security module can share security data with other security modules in the network and coordinate responses to security risks. The interface also provides a universal platform on which to build and incorporate future security modules with minimal modifications to the existing security system. The interface allows a user, such as a network administrator, to easily and efficiently customize the security capabilities of a particular network. The exemplary embodiment described herein is illustrated operating in a distributed computing environment. However, alternative embodiments of the invention can also be implemented in environments other than a network, such as a stand alone computer.

Although the exemplary embodiments will be generally described in the context of software modules running in a distributed computing environment, those skilled in the art will recognize that the present invention also can be implemented in conjunction with other program modules for other types of computers. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description that follows is represented largely in terms of processes and symbolic representations of operations in a distributed computing environment by conventional computer components, including database servers, application servers, mail servers, routers, security devices, firewalls, clients, workstations, memory storage devices, display devices and input devices. Each of these conventional distributed computing components is accessible via a communications network, such as a wide area network or local area network.

The present invention also includes a computer program that embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement the disclosed invention based on the flow charts and associated description in the application text, for example. Therefore, disclosure of a particular set of program code instructions is not considered necessary for an adequate understanding of how to make and use the invention. The inventive functionality of the claimed computer program will be explained in more detail in the following description in conjunction with the remaining figures illustrating the program flow.

Referring now to the drawings, in which like numerals represent like elements throughout the several figures, aspects of the present invention and the preferred operating environment will be described.

Figure 1:
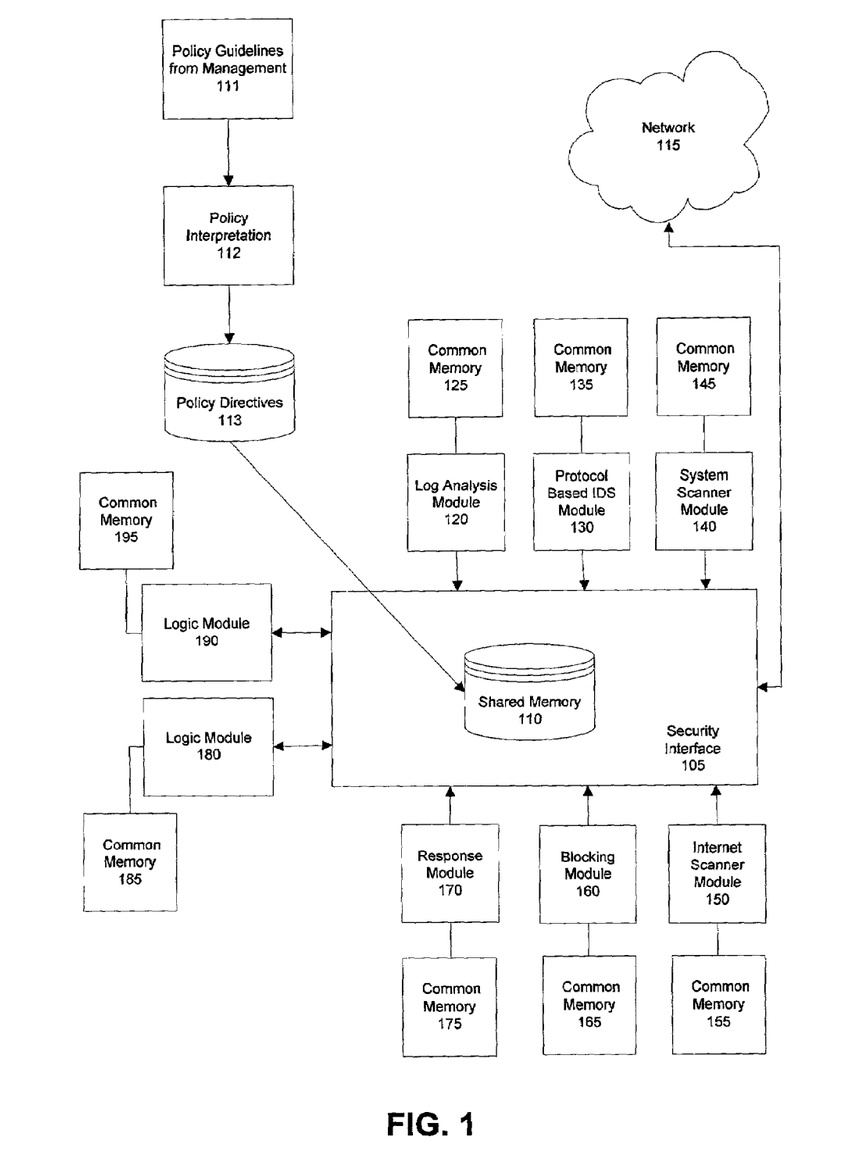
FIG. 1 is a block diagram illustrating an exemplary architecture for operating an embodiment of the present invention.

In FIG. 1, an exemplary architecture for implementing the security interface is illustrated. The architecture in FIG. 1 shows the security interface 105 coupled to a network 115 and a plurality of security modules. In alternative embodiments of the present invention, the plurality of security modules may be coupled directly to the network 115 and the number and type of security modules may vary. The security modules coupled to the security interface 105 can typically be categorized as either monitoring modules, response modules, or logic modules. For example, the log analysis module 120 can examine the security logs of a host on the network 115. The protocol-based intrusion detection module 130 can monitor traffic on the network 115 for unwanted intruders that may cause a security problem. The logic modules 180 and 190 are operable for receiving and processing data from a security module and giving instructions to other security modules. The response module 170 is an example of a security response module that can take action to correct a security issue identified by one of the monitoring modules. For example, the response module 170 could receive security data directly from a monitoring module and take an action. Alternatively, the response module 170 could receive an instruction from a logic module based on data supplied to the logic module by other monitoring modules.

Each of the security modules coupled to the security interface 105 are able to communicate using the shared memory 110. Each security module also comprises a definition file and one or more message processors for processing messages received from other modules. Messages are the means in which security modules communicate. A message definition within the message comprises a unique name and the format of the data the message contains. The message definition allows a security module receiving the message to know what actions to take. In the exemplary embodiment described herein, the messages and other internal data of the security interface 105 are represented as tree data structures. The tree comprises nodes, each node having a name, value, and linkage. The tree data structure is ideal for working with a string of messages and response messages that are linked in a series.

In the exemplary architecture shown in FIG. 1, each security module also utilizes a common memory for storing and sharing state data. The ability to store state data is useful in tracking responses to messages sent to other security modules. In addition to receiving messages from other modules, the security modules can also receive instructions in the form of policy directives set by a manager of the network 115. Security policy guidelines 111 can be formulated by management and stored as policy directives in a storage device 113. The architecture illustrated in FIG. 1 provides an efficient means for disparate security modules to share information and collaborate in performing security functions.

Figure 2A:
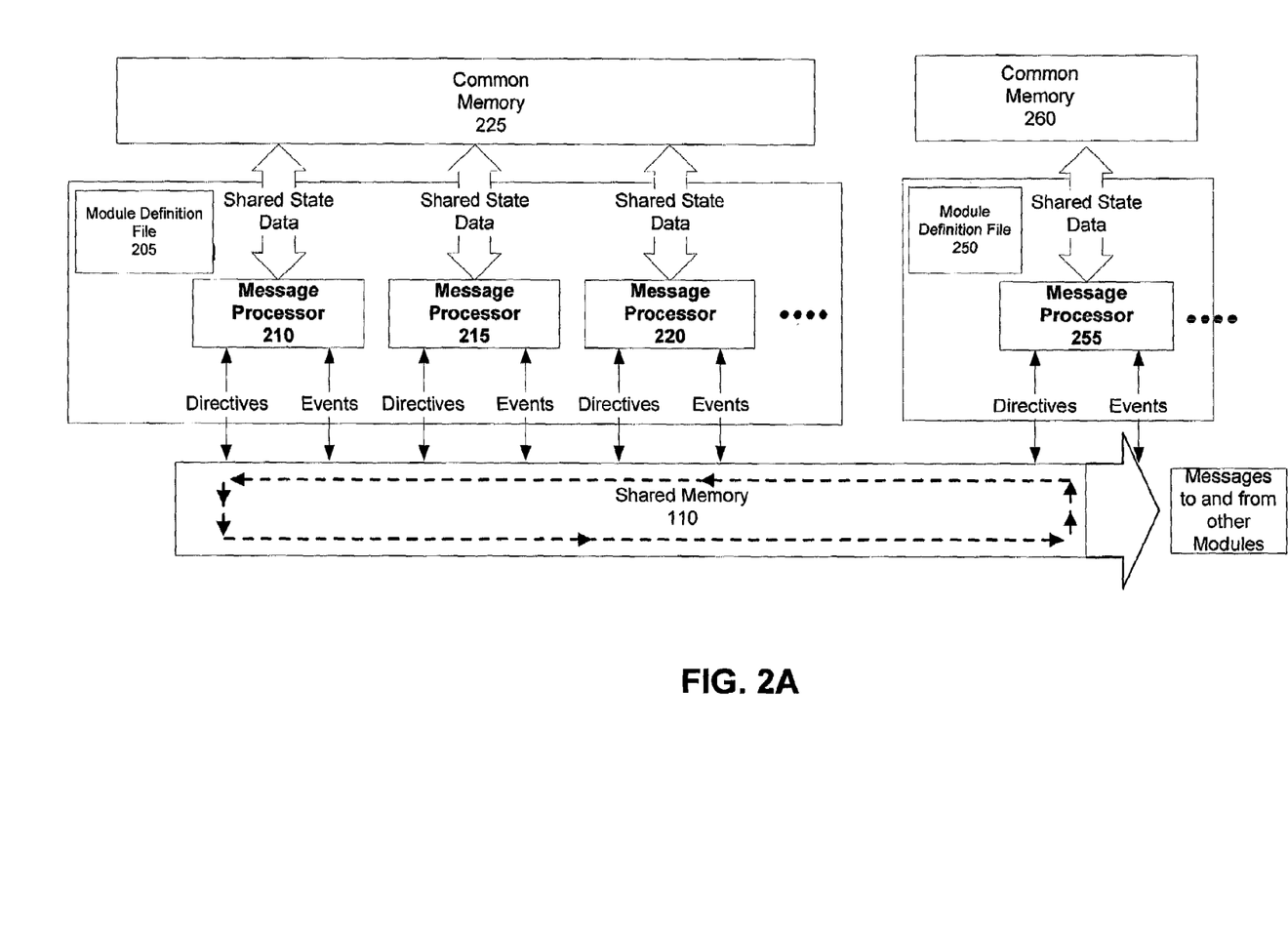
FIG. 2A is a block diagram illustrating a module definition file in accordance with an exemplary embodiment of the security interface invention.

A security module comprises the function code that enables the module to perform its designated task; and a definition file that allows the security module to work with the security interface 105. FIG. 2A illustrates an exemplary module definition file typically found within one of the security modules illustrated in FIG. 1. The module definition file 205 describes the module, the logic it supports, and how it interacts with the security interface 105 and other modules in the system. For example, the module definition file can identify the language the security module is written in, enabling the security interface to support the integration of a variety of security modules. Like the messages and other data in the security interface 105, the exemplary module definition file is organized in a tree structure that can be expressed in XML and corresponding document type definitions (DTDs). The module definition file 205 can comprise various message processors 210, 215 and 220, for receiving messages from other modules via the shared memory 110. Each message processor is designed to receive one type of message. The message processor also stores shared state data in the common memory 225. The state data is used by the message processor for tracking responses received from other security modules. The messaging system allows a message processor to communicate with other message processors within the same security module and with message processors in other security modules.

Figure 2B:
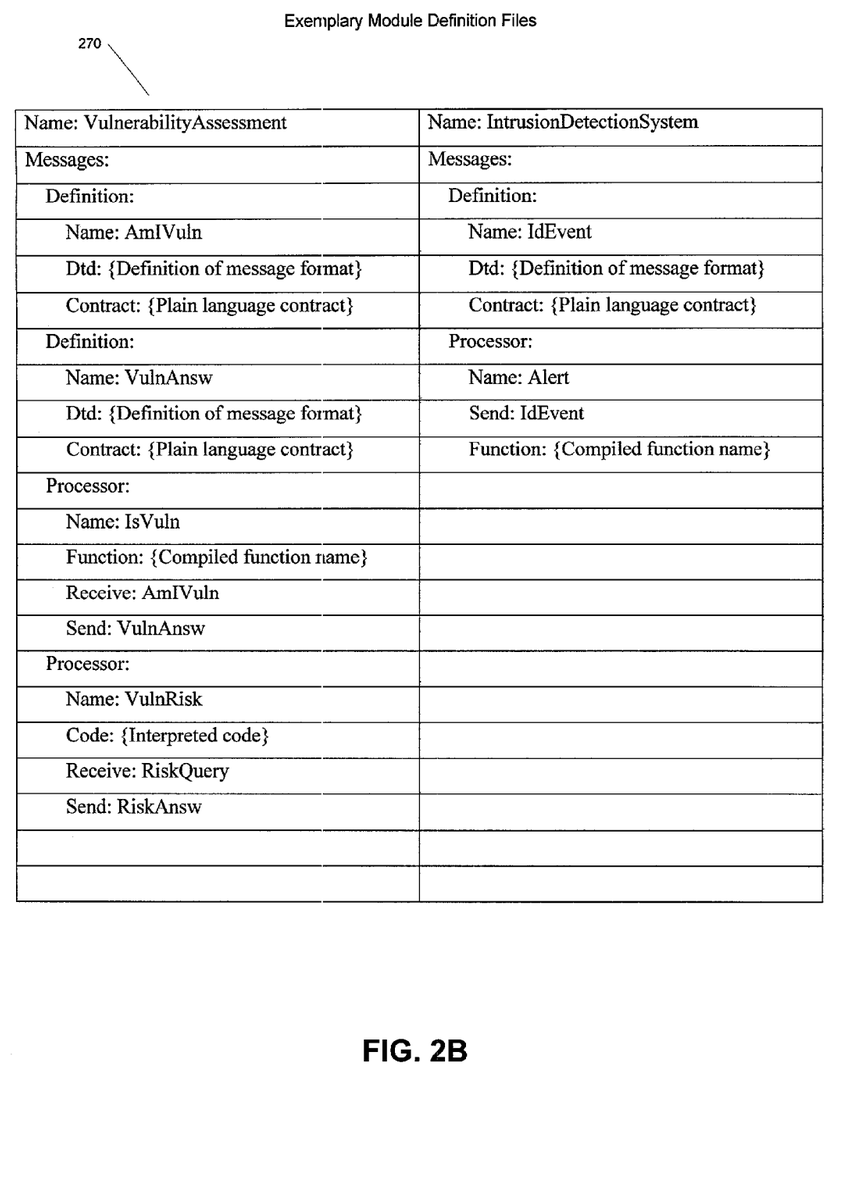
FIG. 2B is a block diagram illustrating a data structure of a module definition file in accordance with an exemplary embodiment of the security interface invention.

FIG. 2B illustrates the information contained in an exemplary module definition file. Definition file 250 is an exemplary file for a vulnerability assessment security module. The file typically contains the name of the security module along with other general configuration information about the security module. The name of the security module is critical because it is used by the security interface 105 to route messages.

After the general information, the definition file 250 comprises information for the individual messages defined within the definition file. The DTD and the contract describe the message. The DTD defines the format for the body of the message and the security interface 105 can use the DTD to check that a message is correctly formatted. The contract is textual information detailing the rules which both sender and receiver of the message must follow in order to validly send or receive such a message.

After the information on individual messages, the definition file contains information for the individual message processors which form part of the security module. The messages that are sent or received by a message processor are declared in the module definition file. The actual definition of the message may be in the module definition file of the sending module, the receiving module, or another module. Declaration of the message types allows the security interface 105 to do error cross-checking for all security modules coupled to the system. The cross-checking process ensures that all messages are properly sent and received. The two processors shown in the exemplary definition file 270 are for identifying a vulnerability and providing the risk associated with that vulnerability.

For example, the first processor may receive a query from an intrusion detection module inquiring whether an event is an identified vulnerability. The code that processes the message can be within the module definition file or, alternatively, may be in an external file that is called by the module definition file. The message processing code responds by transmitting a message back to the intrusion detection module that answers the inquiry. In the meantime, the intrusion detection module may be receiving other messages and responses from other security modules. The intrusion detection module can look to the state data stored in common memory to match the response from the vulnerability assessment module. Subsequently, another processor within the definition file 250 may receive a query from an intrusion detection module as to the risk associated with a vulnerability. The second processor will respond by sending a risk value answer back to the intrusion detection module. This interaction can repeat and produce a series of messages and responses that are each linked to their predecessor message by the linkage established using the tree data structure.

Figure 3:
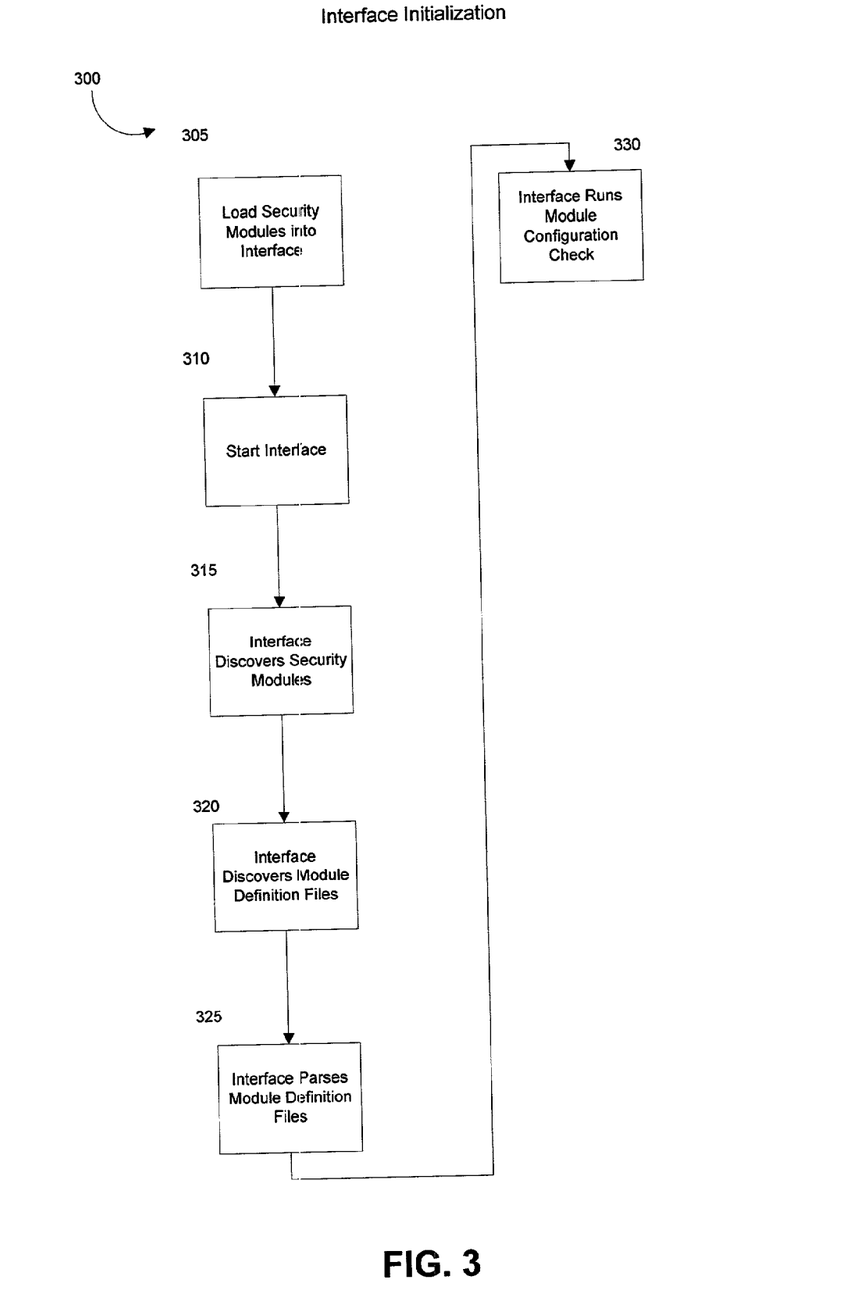
FIG. 3 is a logic flow diagram illustrating an exemplary process for initializing a security interface in accordance with an exemplary embodiment of the present invention.

FIG. 3 illustrates an exemplary process 300 for initializing the security interface 105. In step 305, the various security modules are loaded into the security interface 105. The loading process may comprise physically coupling the security devices to the security interface 105 or installing code accessible by the security interface 105. In step 310, a network administrator can start the security interface 105 and it will begin discovering the individual security modules that are installed in step 315. In steps 320 and 325 the security interface 105 locates the definition files within each security module and parses those files. Parsing the module definition files involves identifying the language in which they are written, the message processors associated with the file, the functions of the message processors, and the other security modules with which the file must communicate. For example, the log analysis module 120 may need to communicate with the blocking module 160, the fix module 170, and the logic module 190. Accordingly, the log analysis module 120 will subscribe to messages sent by the blocking module 160, the fix module 170, and the logic module 190. Other subscription methods, such as message-specific subscription, may be employed in alternative embodiments of the invention. In step 330, the security interface 105 runs a configuration check to ensure that each module that is subscribed to is actually installed on the interface 105 and available for communication.

Figure 4:
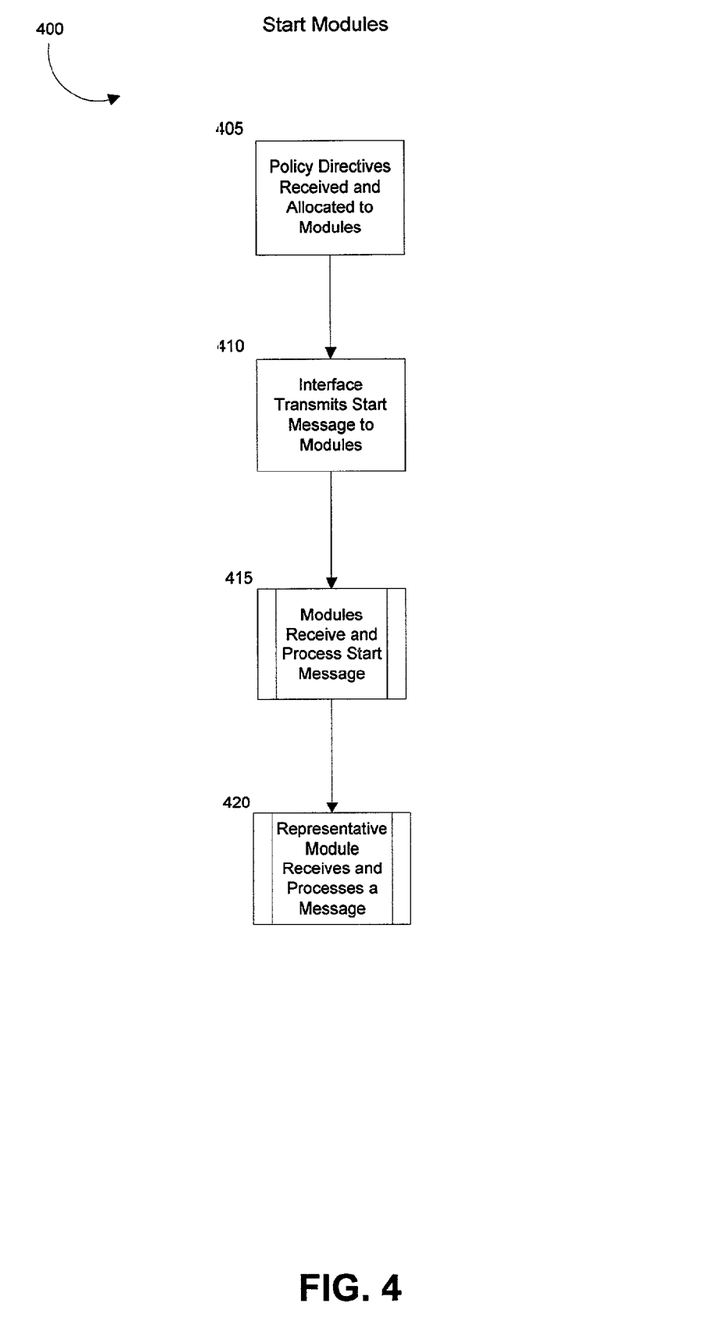
FIG. 4 is a logic flow diagram illustrating an overview of an exemplary process for starting and operating security modules in accordance with an exemplary embodiment of the present invention.

Once the security interface 105 is initialized, it will be ready to start the individual security modules for operation in connection with the network 115. An exemplary process 400 for starting the security modules is illustrated in FIG. 4. In step 405, the security interface 105 receives and allocates policy directives from storage device 113. Policy directives can be specific instructions or policies for handling security events on the network 115. The security interface 105 identifies which security modules need to receive the directives and forwards them accordingly.

In step 410, the security interface 105 transmits a start message to each available security module. In alternative embodiments of the present invention, a security module may call the security interface 105 for the start function. Each security module receives and processes the start message in step 415. An exemplary process for receiving and processing a start message is illustrated in greater detail in FIG. 5. Once the security modules are active, they can begin receiving and processing messages in response to security events on the network 115 in step 420. The security modules can also use the security interface 105 to communicate, share information, and make decisions based on the collective information from the various security modules. FIG. 6 illustrates in greater detail an exemplary operation of a representative security module.

Figure 5:
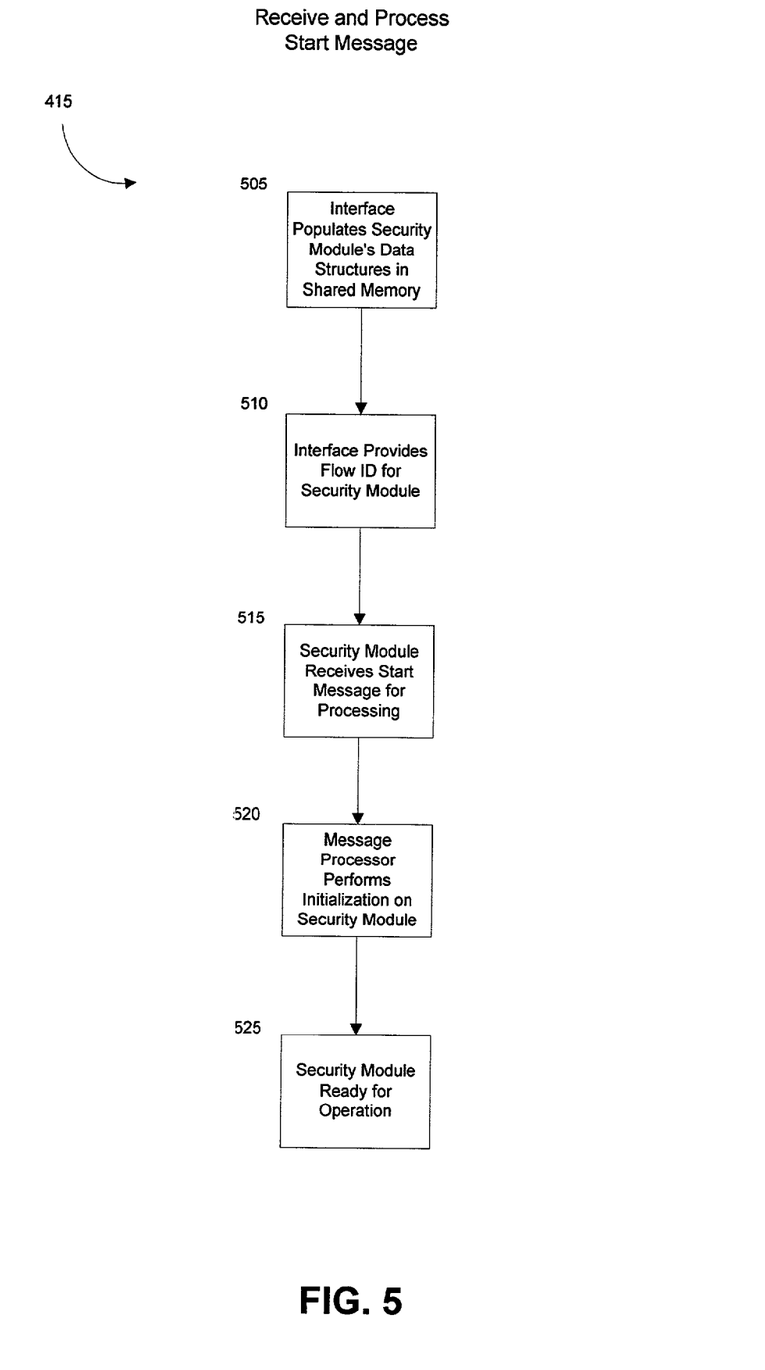
FIG. 5 is a logic flow diagram illustrating an exemplary process for a security module to receive and process a start message received from a security interface.

Referring to FIG. 5, an exemplary process 415 for receiving and processing a start message at a security module is illustrated. In step 505, the security interface 105 populates the particular security module's data structures in the shared memory 110 within the security interface 105. Identifying information for each security module is stored in the shared memory 110 for creating and transmitting future messages. In step 510, the security interface 105 can provide a flow identifier for the security module that is used in building future response messages. The flow identifier corresponds with the tree data structure used in the exemplary embodiment described herein. In step 515, the security module receives the start message from the security interface 105 and the appropriate message processor processes it. In step 520, the message processor undertakes any security module specific initialization that is needed. In step 525, when the message processor responsible for processing the start message is finished, the security interface 105 will know that the security module is ready to operate. In the exemplary embodiment described herein, the security module does not typically respond to a start message. However, a start message may trigger the security module to create a message for forwarding to another security module. An exemplary process for creating and responding to a message is illustrated and described in connection with FIGS. 6A and 6B.

Figure 6A:
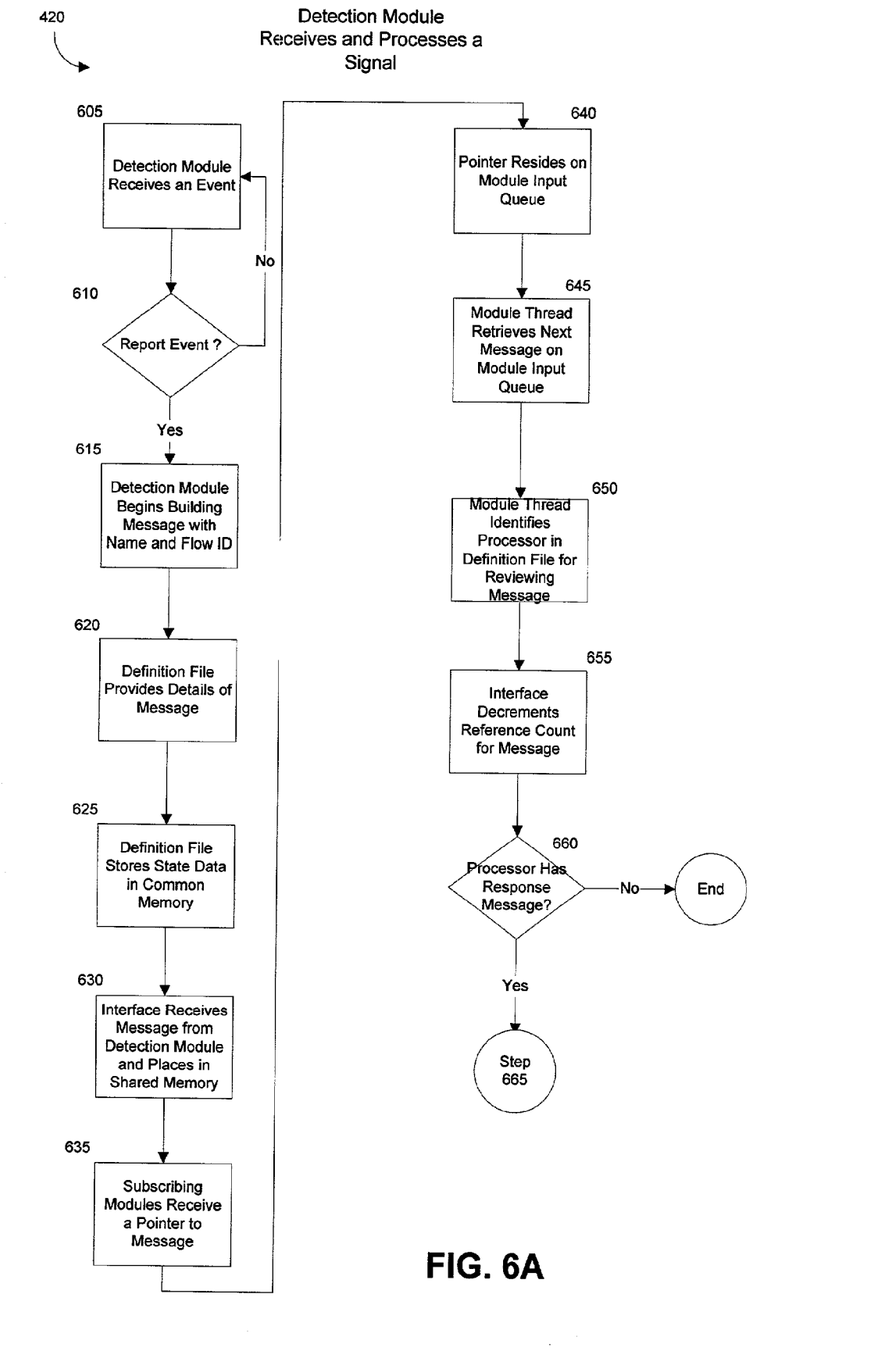
FIG. 6A is a logic flow diagram illustrating an exemplary process for the operation of a representative security module in accordance with an exemplary embodiment of the present invention.
Figure 6B:
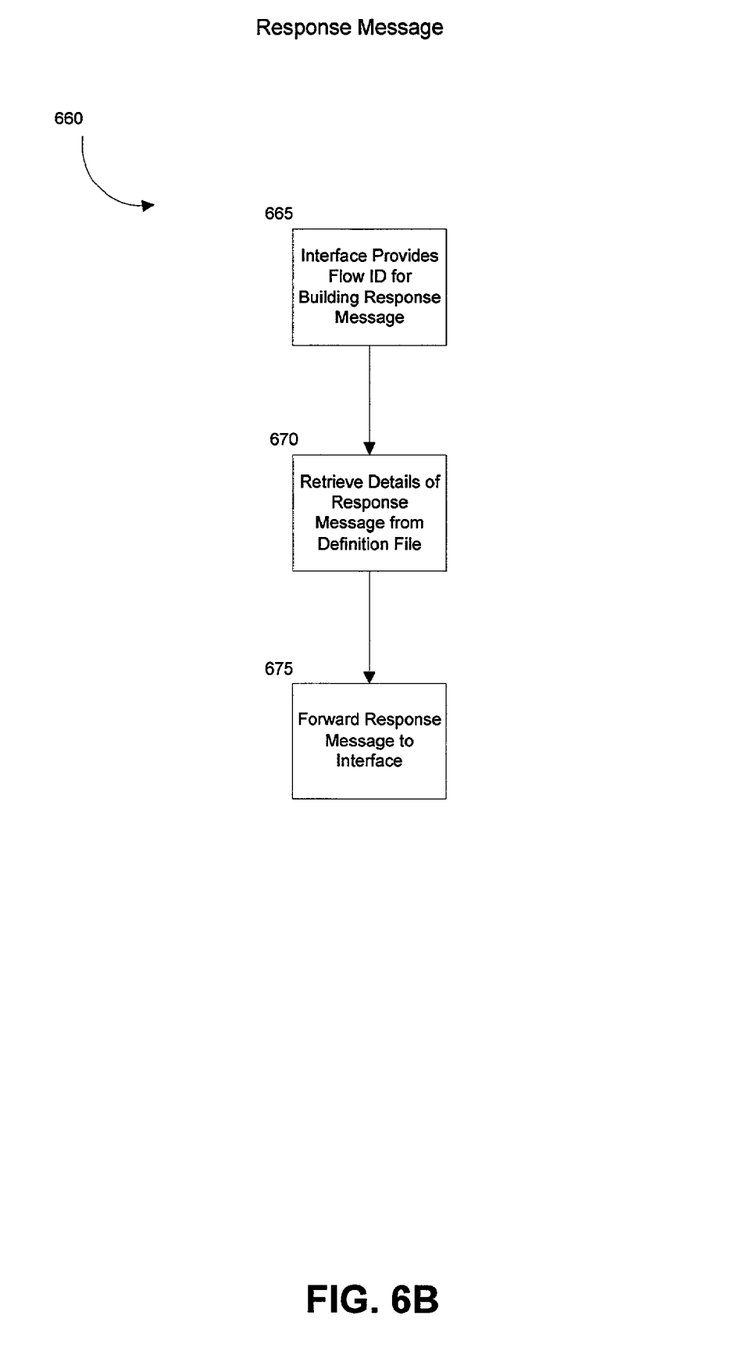
FIG. 6B is a logic flow diagram illustrating an exemplary process for a security module to respond to a security message in accordance with an exemplary embodiment of the present invention.

FIG. 6A illustrates an exemplary process 420 for a security module coupled to the security interface 105 to receive and process a message. The representative security module selected for this example is an intrusion detection module. In step 605, the detection module 130 receives an intrusion event that occurred on the network 115. In step 610, the detection module 130 determines whether the event should be reported. The criteria for determining whether an event should be reported can be based on the functions of the module or the information requested by other modules coupled to the interface 105. If no report is necessary, the detection module continues to perform its monitoring functions on the network 115. If an event report is necessary, in step 615 the detection module begins building a message identifying the event for other security modules coupled to the security interface 105. In order to build the message, the detection module 130 first provides the security interface 105 with a message name. The security interface validates this against known messages from the shared memory 110 and provides a flow identifier from the shared memory 110. The flow identifier, and a message name provided by the definition file 205, permit the security interface 105 and the other security modules to identify and track the message. In step 620, the definition file 205 within the detection module 130 provides the details of the message, namely, the type of security event that was detected. In step 625, the detection module 130 stores the state data for the message in common memory 135. The state data in common memory 135 is used to track responses to previously transmitted messages. Typically, an access object provides the detection module 130 with access to the common memory 135.

Upon receiving the new message from the detection module 130 in step 630, the security interface 105 will place the message in the shared memory 110 for access by other security modules. The security interface 105 identifies the other security modules that have subscribed to this type of message and transmits a pointer for the message to each of those subscribing security modules. In step 640, the pointer will reside on the input queue of other security modules until it is ready for processing. In the exemplary embodiment described herein, a security module thread processes pointers on the input queue on a first in/first out basis. In alternative embodiments of the invention messages may be processed in other orders, such as last in/first out. In step 645, the module thread retrieves the next pointer on the input queue.

In the exemplary embodiment illustrated herein, the security module reads each message on its input queue. In alternative embodiments of the invention, the security module may perform filtering on insignificant or undesired messages. The filtering can be performed by a designated message processor associated with the security module. Message filtering can also be achieved at the subscription step whereby security modules can specifically tailor their subscriptions to particular types of messages. In step 650, the module thread then identifies a message processor within the definition file for reviewing the message stored in the shared memory 110 in step 630 and passes the message to that message processor. Once the message processor has reviewed the message, the security interface 105 will decrement the reference count for that particular message in step 655. Upon reviewing the message the security module may take some action on the host or computer system in response to the security event.

If there is no response message, a security module will do nothing further with the message. If a message processor within a security module has a response to the message, in step 660, the security module will begin building a response message as described in FIG. 6B. In step 665, the security interface 105 provides the responding security module with a flow identifier for the message. The flow identifier, and the message name provided by the definition file 205, correspond with the tree data structure used in the exemplary embodiment described herein. In step 670, the module definition file 205 retrieves the details for the response message and inserts them into the response message. Lastly, the response to the detection module's original message is returned to the security interface 105. The response message will be forwarded to those security modules that have subscribed to that message type. Subscriptions can also be limited to a particular message by associating the subscription request to the flow identifier of the particular message.

In conclusion, the present invention enables and supports security management of individual computers and distributed computing networks. The security interface provides a platform on which a variety of security modules can operate. The security interface allows the various security modules to communicate and share information through a universal messaging system. By sharing information, security modules are able to do a better job of monitoring, assessing risks, and responding to security problems. The universal nature of the security interface allows network administrators to easily interchange and add security modules without expensive customization. Furthermore, the security interface is designed to support various security modules written in different languages.

It will be appreciated that the present invention fulfills the needs of the prior art described herein and meets; the above-stated objects. While there has been shown and described the preferred embodiment of the invention, it will be evident to those skilled in the art that various modifications and changes may be made thereto without departing from the spirit and the scope of the invention as set forth in the appended claims and equivalence thereof. It should be readily apparent that the components of the security audit system can be located in various local and remote locations of a distributed computing environment. Although the present invention has been described as operating in a computing network, it should be understood that the invention can be applied to other types of computing environments, such as a stand alone computer.

What is claimed is:

1. A method for communicating among a plurality of security modules for providing security for a computing network comprising:
 coupling a first security module and a second security module to an interface module;
 identifying the first security module and the second security module with the interface module;
 parsing a first message definition from a first definition file corresponding to the first security module, the first message definition identifying a message the first security module can send;
 parsing a second message definition from a second definition file corresponding to the second security module, the second message definition identifying the message for receipt by the second security module;
 storing the first message definition and the second message definition in the interface module;
 creating the message using the first message definition in the interface module and the first security module;
 placing the message in a shared memory;
 storing state data for the message in a common memory using the first security module; and
 using the second message definition in the interface module to notify the second security module of the message in the shared memory.

2. The method of claim 1, further comprising the step of reviewing the message in the shared memory by the second security module.

3. The method of claim 1, further comprising the step of filtering the message in the shared memory.

4. The method of claim 1, further comprising the step of identifying a processor within the second security module for processing the message in the shared memory.

5. The method of claim 1, wherein the step of creating a message is performed in response to an event received at the first security module.

6. The method of claim 1, wherein the step of creating a message further comprises:
 receiving an event at the first security module; and
 evaluating the event to determine whether a message should be created.

7. The method of claim 1, further comprising the step of running a configuration check on the first security module and the second security module.

8. The method of claim 1, wherein the first message definition and the second message definition comprise a name and a message format.

9. The method of claim 1, wherein the interface is connected to the computing network for which security is being provided.

10. A system for coordinating the use of a plurality of security modules in a computing network comprising:
- a first security module coupled to the computing network, the first security module operable for one or more of detecting, responding, or acting on a security event;
- a second security module coupled to the computing network, the second security module operable for one or more of detecting, responding, or acting on a security event;
- an interface module coupled to the first security module and the second security module, the interface module operable for supporting communication between the first security module and the second security module by
  - receiving a first message definition from a first definition file associated with the first security module, the first message definition identifying a message the first security module can send, and
  - receiving a second message definition from a second definition file associated with the second security module, the second message definition identifying the message for receipt by the second security module, and
  - storing the first message definition and the second message definition in the interface module so that the second security module can receive the message from the interface module using the second message definition; and
- a common memory for storing state data for the message from the first security module.

11. The system of claim 10, wherein the first security module and the second security module are coupled to the computing network through the interface module.

12. The system of claim 10, wherein the first security module comprises a first definition file comprising formatting and processing data.

13. The system of claim 10, wherein the interface module further comprises a shared memory operable for storing the message received from the first security module.

14. The system of claim 13, wherein the second security module comprises a second queue for receiving notification of the message stored in the shared memory.

15. The system of claim 10, wherein the first security module is further coupled to a first common memory for storing data associated with a message.

16. The system of claim 10, wherein the interface module is further coupled to an administration system for providing security policy instructions.

17. A method for integrating a plurality of security modules for use in providing security for a computing network comprising:
- coupling a first security module and a second security module to an interface module;
- identifying the first security module and the second security module with the interface module;
- receiving at the interface a first message definition from the first security module, the first message definition identifying a message the first security module can send; and
- receiving at the interface a second message definition from the second security module, the second message definition identifying the message for receipt by the second security module;
- storing the first message definition and the second message definition in the interface module;
- creating the message in response to an event received at the first security module, the message created using the first security module, the first message definition, and the interface module;
- storing the message in the interface module;
- storing state data for the message in a common memory using the first security module; and
- sharing the message with the second security module in response to the second message definition identifying the message for receipt by the second security module.

18. The method of claim 17, further comprising the step of filtering the message for the second security module.

19. The method of claim 17, wherein the message is stored within a shared memory in the interface module.

20. The method of claim 17, further comprising the step of identifying a processor within the second security module for processing the message.

21. The method of claim 17, wherein the step of creating a message in response to an event further comprises evaluating the event to determine whether a message should be created.

22. The method of claim 17, further comprising the steps of:
- coupling a third security module to the interface module;
- identifying the third security module with the interface module; and
- receiving at the interface module a third message definition from the third security module.

23. The method of claim 17, wherein the first security module and the second security module are directly connected to the computing network for which security is being provided.

24. The method of claim 17, wherein the first security module and the second security module are connected through the interface module to the computing network for which security is being provided.

* * * * *